UNITED STATES PATENT OFFICE.

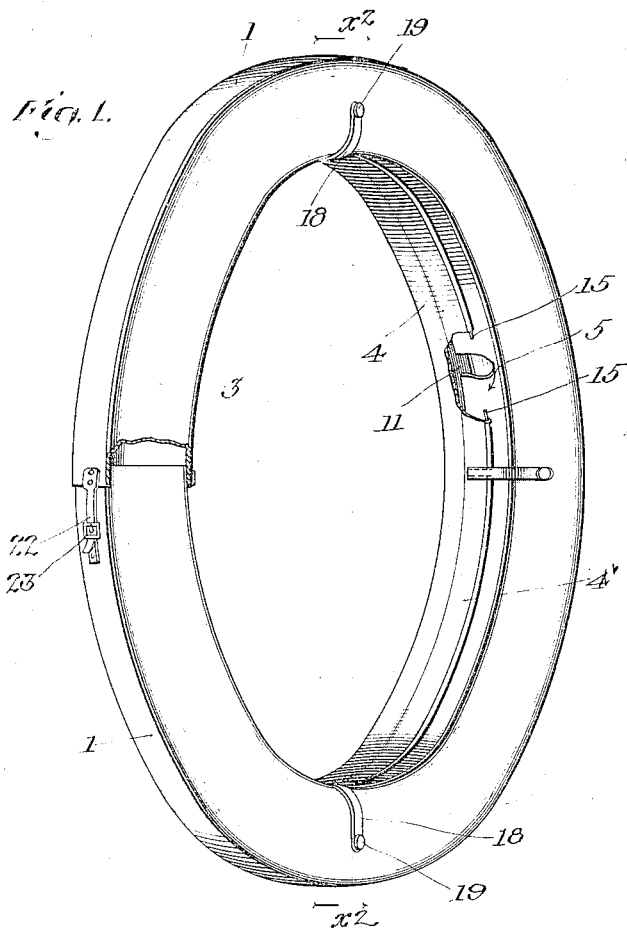
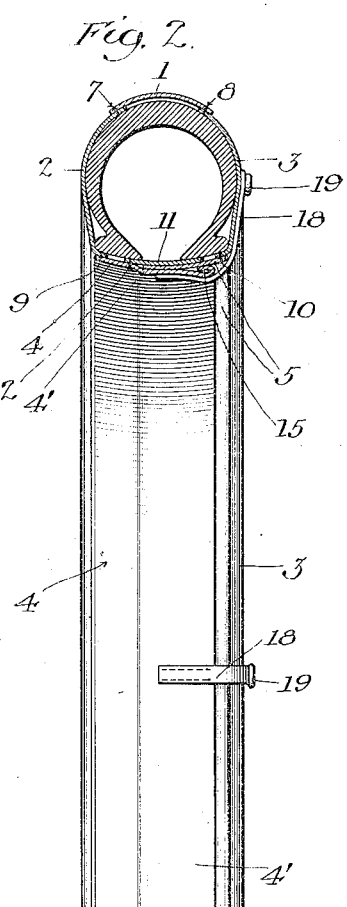
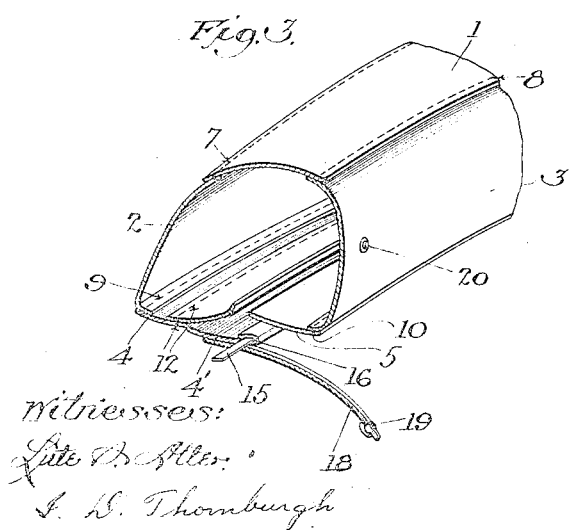

PAUL PEIRCE, OF LOS ANGELES, CALIFORNIA, ASSIGNOR TO R. B. BAILEY COMPANY, OF LOS ANGELES, CALIFORNIA, A CORPORATION OF CALIFORNIA.

TIRE-COVER.

1,131,077.  Specification of Letters Patent.  Patented Mar. 9, 1915.

Application filed July 17, 1911. Serial No. 839,037.

*To all whom it may concern:*

Be it known that I, PAUL PEIRCE, a citizen of the United States, residing at Los Angeles, in the county of Los Angeles and State of California, have invented a new and useful Improvement in Tire-Covers, of which the following is a specification.

This invention relates to covers for protecting automobile tires, and the main object of the invention is to provide a cover for this purpose which will reduce the number of external joints to a minimum and present a neat appearance, as well as protect the tire from excess of dust or water adhering thereto.

Other objects of the invention will appear hereinafter.

The accompanying drawings illustrate the invention, and referring thereto: Figure 1 is a perspective of the cover in place on a tire with portions broken away. Fig. 2 is a section on line $x^2$—$x^2$ in Fig. 1. Fig. 3 is a perspective of a portion of the cover showing the construction of the parts thereof.

The cover comprises an outer or tread member 1 formed as a strip of suitable length to reach around the periphery of the tire and overlap slightly at the ends, a rear side member 2 formed as an annular strip of substantially the same length as the strip 1, a front side member 3 formed as a strip of substantially the same length as the outer strip 1, the said strips 2 and 3 being of sufficient length to extend respectively over the rear and front of the tire, and inner flaps 4 and 5 attached respectively to the inner edges of the side strips 2 and 3, and adapted to overlap and engage with one another to form a joint which will exclude dust and rain. The aforesaid strips and flaps may be made of any suitable flexible material such as oil cloth or other waterproof fabric and are joined together by seams 7, 8, 9, and 10, extending longitudinally of the respective strips, so as to form an annular tube divided longitudinally along its inner portion, and transversely divided to overlap at its ends.

The flap 4 is provided with a supplementary or inner flap 11 secured thereto by seam 12, and extending directly beneath the edge portion of the flap 4 to form a circumferential recess or pocket between the inner flap 4 and the inner flap 11 which is substantially parallel with the inner face of the tire and adapted to receive the edge of the flap 5 on the front side of the cover the outer portion 4' of the flap 4 and the supplementary flap 11 embracing the flap 5 and closely fitting the same, so as to maintain a joint which is dust proof and which will shed any water which may fall on the tire cover. The several flaps 4, 5 and 11 are all of about substantially the same length as the annular side strips of the cover, so as to extend throughout the length of the cover. This construction provides a water tight joint for the cover, irrespective of which part of the cover is uppermost. In order to hold the inner flap portion 4' closely against the flap 5 when the cover is placed on the tire, elastic stiffening means may be provided for said inner flap portion consisting of a strip 15 of elastic material preferably metal extending in a pocket 16 formed by turning over and seaming the edge portion of the flap 4. Means are preferably provided for securing the two sides of the cover together when the cover is in position on the tire, said means consisting of straps 18 secured to the flap 4 and adapted to extend over the flap 5 and be secured to the outside strip 3, said straps 18 being, for example, provided with sockets 19 adapted to engage buttons 20 on the side strip 3. Means are also provided for securing the ends of the annular cover together, said means consisting, for example, of a strap 22 on one end of said cover engaging with a buckle 23 on the other end of said end portion of the cover.

The cover is used as follows: The several fastening devices above described, being unfastened, the cover is slipped onto the tire from the outside and the flaps 4 and 5 are turned in within the inside of the tire, the flap 5 being inserted between the outer and inner flap portions 4 and 11, and the flap portion 4' springing out against the flap 5 by reason of the elastic action of the strip 15 and pinching the flap 5 firmly against flap 11 and holding the latter firmly against the inner circumferential face of the tire. The cover is then drawn tight longitudinally by the strap 22 and buckle 23 and the straps 18 are then brought up on the outside of the tire and fastened to the side strip by the fastening devices 19 and 20, the buttons 20 being so located that the fastening is effected in convenient location and at a point where the tire presents a solid or resisting body beneath the fastening device, enabling the button to be pressed into engagement with the socket more readily than where the fastening occurs at the inner portion of the tire cover, directly over the channel in the tire which receives the flange of the rim when the tire is in use.

The pocket formed between flaps 11 and 4 is very wide so that a considerable telescopic adjustment is possible for the flap 5 in order to accommodate tires of varying sizes without completely withdrawing the flap 5 from the said circumferential recess. This recess is substantially cylindrical and readily permits of this telescopic action of flap 5. The strip 15 acts irrespective of the position of flap 5 to press the flap 5 firmly toward the tire, thereby firmly pressing flaps 5 and 11 toward the inner circumferential face of the tire and forming a watertight joint.

It will be noted that the above described construction avoids the use of any transverse slit or division in the cover, except that required at the joint at the ends of the cover. The end portion of the cover which is uppermost overlaps and extends outside of the lower portion of the cover, acting as a water-shed, and the tubular overlapping joint formed by the flap portions 5, 4 and 11 on the inside of the cover forming an effectual water-shed therein, without the use of any transverse division.

What I claim is:

1. A tire cover adapted to surround a tire, said cover opening around its inner periphery, a bifurcated flap on one side of the cover forming a pair of circumferential flap members adapted to rest within the inner periphery of the tire, a flap on the other side of the cover adapted to be inserted between the members of said bifurcated flap, and spring means along the edge of the inner member of said bifurcated flap adapted to press the flaps toward the inner periphery of the tire to form a water-tight joint between said flaps.

2. A tire cover adapted to surround a tire, said cover opening around its inner periphery, a bifurcated flap on one side of the cover forming a pair of circumferential flap members adapted to rest within the inner periphery of the tire, a flap on the other side of the cover adapted to be inserted between the members of said bifurcated flap, and a circumferential spring ring extending along the edge of the inner member of said bifurcated flap adapted to press the flaps toward the inner periphery of the tire to form a water-tight joint between said flaps.

In testimony whereof, I have hereunto set my hand at Los Angeles, California this 21st day of June 1911.

PAUL PEIRCE.

In presence of—
ARTHUR P. KNIGHT,
GLADYS RUSSELL.